United States Patent [19]

Johnson et al.

[11] 4,376,709

[45] Mar. 15, 1983

[54] INTERCALATED LAYERED MIXED OXIDES

[75] Inventors: Jack W. Johnson, Fanwood; Allan J. Jacobson, Princeton, both of N.J.

[73] Assignee: Exxon Research and Engineering Co., Florham Park, N.J.

[21] Appl. No.: 205,456

[22] Filed: Nov. 10, 1980

[51] Int. Cl.$^3$ .............................................. C07F 7/00
[52] U.S. Cl. ................................... 252/1; 210/660; 260/429 R; 423/593; 423/594; 423/595; 423/596; 423/598; 423/599; 423/600; 423/602; 423/603; 429/218; 546/348
[58] Field of Search ................ 252/1; 260/429 R; 423/62, 64, 593–603; 210/660; 429/218; 546/348

[56] References Cited

U.S. PATENT DOCUMENTS

| | | | |
|---|---|---|---|
| 3,688,109 | 8/1972 | Gamble | 250/51.5 |
| 3,766,064 | 10/1973 | Gamble et al. | 252/25 |
| 3,933,688 | 1/1976 | Dines | 252/520 |
| 3,980,684 | 9/1976 | Dines | 260/429 |
| 4,049,887 | 9/1977 | Whittingham | 492/112 |
| 4,094,893 | 6/1978 | Dines | 260/429 |
| 4,232,146 | 11/1980 | DiGiacomo et al. | 260/429 R X |
| 4,235,990 | 11/1980 | DiGiacomo et al. | 260/429 R X |
| 4,237,061 | 12/1980 | Johnson | 260/429 R X |

OTHER PUBLICATIONS

Whittingham, J. Electrochem Soc., 123, 315, (1976).
Chernorukov et al., Russian J. Inorg. Chem., 23, 1627, (1978).
Chernorukov et al., Russian J. Inorg. Chem., 24, 987, (1979).
G. Ladwig, Chemical Abstracts, 92, 193079p, (1980).
G. Ladwig, Z. Anorg. Allg. Chem. 338, 266–278, (1965).
G. Ladwig et al., Ukrainskii Khimischeskii Zhurnal, 43, 842–844, (1977).
G. Ladwig, XXth Int. Cong. Pure Appl. Chem., Moscow Abstracts, D31, (1965).
Seeboth et al., Chem. Tech., vol. 28, pp. 730 to 734, (1976).

*Primary Examiner*—Leland A. Sebastian
*Attorney, Agent, or Firm*—James H. Takemoto

[57] ABSTRACT

New intercalated compounds comprising a cation intercalated in a layered mixed oxide, said oxide having layers of corner linked octahedra and tetrahedra. The composition has the formula $A_qMOXO_4 \cdot nH_2O$ where A is a monovalent, divalent or polyvalent cation, $MOXO_4$ is a layered mixed oxide selected from the group consisting of $VOPO_4$, $VOSO_4$, $VOAsO_4$, $VOMoO_4$, $NbOPO_4$, $NbOAsO_4$, $TaOPO_4$ and $MoOPO_4$, n is a number from 0 to 4 and q is a number from about 0.001 to about 1.0.

11 Claims, No Drawings

INTERCALATED LAYERED MIXED OXIDES

BACKGROUND OF THE INVENTION

This invention relates to layered mixed oxides intercalated with cations. More particularly, layered oxides containing Group VB or VIB transition metals are intercalated with cations.

U.S. Pat. No. 3,766,064 discloses that heavy metal chalcogenides wherein the chalcogen is sulfur, selenium, or tellurium and the heavy metal is titanium, vanadium, zirconium, niobium, hafnium, tantalum, palladium, platinum, and gallium can be intercalated with guest species such as ammonia, hydrazine and organic nitrogen compounds. The heavy metal chalcogenide may contain a single heavy metal cation or mixtures of such cations. The guests are electron donors or acceptors, have strong polarization interactions or are capable of d-orbital bonding. U.S. Pat. No. 3,688,109 describes x-ray diffraction gratings containing similar heavy metal chalcogenides intercalated with Lewis acids or bases, charge transfer donors or acceptors, compounds with large polarization interactions or compounds capable of d-orbital bonding. Ionic molecules are stated to have large polarization interactions. Chalcogens are sulfur, selenium, or tellurium.

U.S. Pat. No. 3,980,684 teaches compounds wherein a metallocene is intercalated into a layered metal chalcogenide. The metal is selected from Groups IVb, Vb, tin or mixtures of Groups Vb and VIb and the chalcogen is selenium or sulfur. U.S. Pat. No. 4,094,893 is directed to intercalation compounds wherein a host of the formula $TX_2$ where T is Ti, Hf, V, Nb, Ta, Mo or W, and X is S, Se or Te is intercalated with an isonitrile organic guest.

U.S. Pat. No. 3,933,688 relates to a method of lithiating metal chalcogenides of the formula $MZ_y$ where Z is S, Se or Te and M is a Group IVb metal, Group Vb metal, Mo, W, Ti, Pt, Re, Ge, Sn or Pb and y is from 1 to 4 to form lithium intercalates.

U.S. Pat. No. 4,049,887 discloses an improved cathode wherein the cathode-active material is an intercalated layered compound of the formula $MA_xB_y$ where M is Fe, V, Ti, Cr or In, A is an oxide, sulfide, selenide or telluride, B is a halide and x and y are equal to about 2.

Whittingham, J. Electrochem. Soc., 123, 315 (1976) discloses that cell reactions between lithium and several transition metal oxides and sulfides produce ternary phases. Cell reversibility was found to be optimized where no chemical bonds were broken during discharge, i.e., where ternary phases were formed by an intercalation reaction. The $V_2O_5$ system results in some broken chemical bonds and therefore only partial or difficult reversibility is found. Chernorukov et al., Russian J. Inorg. Chem., 23, 1627 (1978) and 24, 987 (1979) report on structural studies of $NbOPO_4.3H_2O$ and $NbOPO_4.2H_3PO_4.5H_2O$. Both compounds are reported to have layered structures which are capable of reversible intracrystalline expansion by absorbing various molecules.

SUMMARY OF THE INVENTION

It has been discovered that layered mixed oxides form intercalated compounds with cations. The compositions of the inventions comprise a cation intercalated in a layered mixed oxide having layers of corner linked octahedra and tetrahedra, said composition having the formula $A_qMOXO_4.nH_2O$ where A is a mono-, di- or polyvalent cation; $MOXO_4$ is a layered mixed oxide selected from the group consisting of $VOPO_4$, $VOSO_4$, $VOAsO_4$, $VOMoO_4$, $NbOPO_4$, $NbOAsO_4$, $TaOPO_4$ and $MoOPO_4$; n is a number from 0 to 4 and q is a number from about 0.001 to about 1.0.

The above-mentioned layered mixed oxides are reactive with cations in the presence of a reducing agent to form the present intercalated incorporated compounds. The value of q, i.e., the amount of cation incorporated varies according to the size and valence of the A cation, and the reaction conditions.

DETAILED DESCRIPTION OF THE INVENTION

Intercalation compounds generally contain a layered host and a guest. The layered mixed oxide hosts according to the invention preferably have the formula $MOXO_4.nH_2O$ with n=0–3. The hosts share a common structural feature in that the layers of the host are composed of distorted $MO_6$ octahedra and $XO_4$ tetrahedra linked through corner-shared oxygen atoms. As noted above, the octahedra are distorted and in the case of anhydrous compounds, contain one very long and one very short metal-oxygen bond. When hydrated, the coordinated water replaces the long metal-oxide bond.

In the formula $MOXO_4.nH_2O$, M is V, Nb, Ta or Mo and X is P, As, S or Mo. Examples of mixed oxide hosts which have the above-cited structural features are $VOPO_4.nH_2O$, $VOSO_4.nH_2O$, $VOAsO_4.nH_2O$, $VOMoO_4.nH_2O$, $NbOPO_4.nH_2O$, $NbOAsO_4.nH_2O$, $TaOPO_4.nH_2O$ and $MoOPO_4.nH_2O$. Preferred mixed oxide hosts are $VOPO_4.nH_2O$, $VOSO_4.nH_2O$, $VOAsO_4.nH_2O$ and $VOMoO_4.nH_2O$, especially $VOPO_4.nH_2O$ and $VOAsO_4.nH_2O$. The mixed oxide hosts are available commercially and/or are described in the literature, e.g., A. F. Wells, "Structural Inorganic Chemistry," 4th ed., Oxford Press, London.

Cations which may be employed as intercalated guests are monovalent, divalent, and polyvalent cations. The cations may be either metallic or non-metallic. Metallic cations may be from Groups IA–VIA, IB–VIIB and VIII of the Periodic Table as set forth on page 622 of "The Condensed Chemical Dictionary," 9th ed., rev. by G. Hawley, Van Nostrand Reinhold Co. Non-metallic cations may be from Groups IVA–VIIA.

Examples of metallic cations are alkali metal cations, alkaline earth metal cations, $Al^{3+}$, $Pb^{2+}$, $Bi^{3+}$, $Sn^{2+}$ and transition metal cations such as $Fe^{3+}$, $Ni^{2+}$, $Mn^{2+}$, $Cr^{3+}$, $Zn^{2+}$, $Zr^{4+}$, $Pd^{2+}$, $Cu^{2+}$, $Co^{2+}$, $Ag^+$ and $Hg^{2+}$. Other metallic cations are organometallic cations such as cobaltocenium and ferrocenium, and positively charged coordination complexes, e.g., $NiL_6$, $CoL_6$, $FeL_6$, $CuL_4$ and $PdL_4$ wherein L is any ligand coordinately bound to the central metal of the coordination complex such as amine, phosphine, halo, aquo and the like with the proviso that if any given ligand bears a negative charge, it may not be present in such an amount as to render the overall charge on the coordination complex neutral or negative.

Non-metallic cations include hydrogen, hydronium, substituted and unsubstituted ammonium, phosphonium, arsonium and sulfonium, salts of heterocyclic amines and organic cations. Substituted ammonium, phosphonium, arsonium and sulfonium cations have the formulae $NR_4^+$, $PR_4^+$, $AsR_4^+$ or $SR_3^+$ where each R is independently hydrogen, $C_1$–$C_{10}$ aliphatic, $C_3$–$C_8$ cycloaliphatic, $C_7$-$C_{15}$ aralkyl or $C_6$-$C_{10}$ aryl. Examples of non-metallic cations are $H^+$, $H_3O^+$, $N(CH_3)_4^+$, $H_3NCH_2CH_3^+$, $P(C_6H_5)_4^+$, $S(CH_3)_3^+$, $H_2N(C_6H_5)_2^+$, $H_3NCH_2C_6H_5^+$,

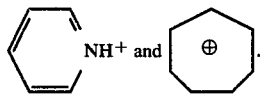

Representative of the intercalated compounds of the formula $A_qMOXO_4.nH_2O$ are $Na_qVOPO_4.2H_2O$, $K_qVOAsO_4.2H_2O$, $Mg_qVOPO_4.2H_2O$, $Fe_qVOSO_4.2H_2O$, $(NH_4)_qVOSO_4.2H_2O$, $(N(CH_3)_4)_qVOPOP_4.2H_2O$, $Sn_qVOAsO_4.2H_2O$, $(Co(C_5H_5)_2)_qVOPO_4.2H_2O$, $H_qVOPO_4.2H_2O$, $(N_2H_5)_qVOAsO_4.2H_2O$, $Ca_q.VOAsO_4.2H_2O$, $(Ni(NH_3)_6)_qVOPO_4.2H_2O$, $Mn_qVOSO_4.2H_2O$ and $(NH_3OH)_qVOPO_4.2H_2O$.

The intercalated compounds may be prepared by contacting layered mixed oxides in an aqueous or nonaqueous medium with a reducing agent in the presence of A cations. Suitable reducing agents are, e.g., $S_2O_4^{2-}$, $I^-$, $Cr^{2+}$, $Eu^{2+}$, $Co(NH_3)_6^{2+}$, hydrazine, hydroxylamine, $SO_3^-$, $Fe^{2+}$, $Sn^{2+}$, $NO_2^-$ and the like. Temperatures are not critical and may range from about 0° C. to about 250° C. In the course of the reaction, the layered mixed oxide is at least partially reduced and at the same time A cations are inserted into the layered oxide structure. In the case of $VOPO_4.2H_2O$, the reaction is as follows:

$$VOPO_4.2H_2O + qNaI \rightarrow Na_qVOPO_4.2H_2O + q/2\ I_2.$$

The effect of intercalation on interlayer spacing in the layered oxide is difficult to predict and may either increase or decrease according to the nature of the cation intercalated.

Other intercalated compositions may be prepared by ion-exchange of one cation for another. The compositions may be further varied by water exchange with a polar solvent to give intercalates of the formula $A_q.MOXO_4.yZ$ where A, q and $MOXO_4$ are defined as set forth hereinbefore, y is from about 1 to 4 and Z is a polar solvent. Examples of polar solvents which may exchange for the water of hydration are alcohols, amines, amides, sulfoxides and the like.

The ratio of intercalated guest to layered mixed oxide host in the preparative reaction can be varied across broad ranges. As a result, the ratio of cation:layered mixed oxide as reflected by q in the general formula $A_qMOXO_4.nH_2O$ can vary from very small values such as $q=0.001$ to approximately stoichiometric quantities, i.e., $q \cong 1.0$. There is usually an excess of cation present, and the resulting q values are preferably from about 0.1 to about 0.5.

The intercalated compounds according to the invention are useful as electrode materials in devices such as batteries and electrochromic displays, as ionic conductors and as inorganic ion exchangers.

The following examples are further illustrative of the invention.

EXAMPLE 1

$VOPO_4.2H_2O$ was prepared as described in Z. Anorg. Chem., 338, 266, (1963) in the form of yellow platelets. A sample of solid $VOPO_4.2H_2O$ was treated with a dilute aqueous solution of sodium dithionite. Reaction was evidenced by a change in color from the initial yellow to a dark green and by a decrease in the interlayer spacing from 7.44 Å to 6.54 Å as determined by powder X-ray diffraction.

EXAMPLE 2

$VOPO_4.2H_2O$ was trated with excess aqueous NaI. The supernatent turned brown denoting the formation of $I_3^-$ while the solid turns dark yellow to green, as in Example I. The reaction is as follows:

$$VOPO_4.2H_2O + qNaI \rightarrow Na_qVOPO_4.2H_2O + q/2\ I_2$$

A stoichiometry wherein $q=0.44$ was confirmed by titration of the liberated $I_2$ with sodium thiosulfate and by elemental analysis of the reaction product for Na and V. The water content was determined by TGA. An X-ray powder pattern gave a series of 001 reflections indicating a layer spacing of 6.54 Å. Corresponding alkali metal intercalates for A=Li, K and Cs were prepared in an analogous fashion.

EXAMPLE 3

Yellow $VOAsO_4.2H_2O$ was prepared by the method described in Russian Journal of Inorg. Chem. 23, 2672, (1978). Solid $VOAsO_4.2H_2O$ was reacted with aqueous Li, Na, and K iodides to give Li, Na and K intercalates respectively. In these cases, the starting material goes from yellow to dark brown. Additional experiments on $A_qVOAsO_4.2H_2O$ series established that the reaction proceeds with reduction of a portion of the $V^{5+}$ to $V^{4+}$. The infrared spectrum of $Na_{0.5}VOAsO_4.2H_2O$ exhibits vanadyl (V=O) stretching bands at 992 and 1012 cm$^{-1}$, while $VOAsO_4.2H_2O$ exhibits only one vanadyl band at 1010 cm$^{-1}$. This indicates that the sodium compound has both $V^{5+}$ and $V^{4+}$, while $VOAsO_4.2H_2O$ contains only $V^{5+}$. Electron spin resonance measurements also show a $V^{4+}$ resonance that is of the intensity calculated for 0.5 $V^{4+}$ per formula unit.

EXAMPLE 4

Solid $VOPO_4.2H_2O$ was reacted with excess of an aqueous solution of $MgI_2$. A similar reaction to that of Example 2 was observed. However, x-ray diffraction revealed a larger lattice spacing (9.60 A) than for the analogous sodium material indicating the incorporation in the interlayer space of a greater amount of water for the magnesium cation with its higher charge to radius ratio.

EXAMPLE 5

The sodium intercalate of $VOPO_4.2H_2O$ prepared as described in Example 2 was treated with 100 ml of an 0.5 molar solution of calcium chloride. An ion exchange reaction of sodium in the solid intercalation compound with calcium ions in the solution to give the calcium intercalation compound was monitored using a sodium ion selective electrode system. After 4.5 h the sodium ion concentration in the aqueous phase reached a maximum and then remained constant. The final concentration of sodium in the aqueous phase corresponded to complete exchange of sodium by calcium.

EXAMPLE 6

Solid $VOPO_4.2H_2O$ and $VOAsO_4.2H_2O$ were separately reacted with an excess of an aqueous solution of $NiI_2.6H_2O$. The supernatant solutions turned dark brown and the solids dark green and brown similar to the reactions of Example 2 and 3.

The reactions are:

VOPO$_4$.2H$_2$O + xNiI$_2$ → Ni$_x$VOPO$_4$.nH$_2$O + x I$_2$ and

VOAsO$_4$.2H$_2$O + yNiI$_2$ → Ni$_y$VOAsO$_4$.mH$_2$O + y I$_2$

Stoichiometries as determined by titration of the liberated iodine and elemental analysis were x=0.23 and y=0.21. The water content varies somewhat with the ambient humidity. At 50% relative humidity Ni$_{0.2-3}$VOPO$_4$.nH$_2$O showed two separate 001 series of lines in the x-ray powder pattern with lattice spacings of 6.7 Å and 8.80 Å indicating two phases with different hydration numbers(n). Ni$_{0.21}$VOAsO$_4$.mH$_2$O under the same relative humidity conditions showed only a single interlayer separation of 6.76 Å.

EXAMPLE 7

Anhydrous VOPO$_4$ was reacted with excess of a 1 M solution of lithium iodide in acetonitrile. A sample vial was shaken for 10 days in a helium filled glove box. The supernatant turned dark red-brown indicating the formation of iodine and the solid turned dark green. The reaction is:

zLiI + VOPO$_4$ → Li$_z$VOPO$_4$ + z/2 I$_2$

Elemental analysis for lithium, vanadium and phosphorous gave a ratio of Li:V:P of 1.0:1.0:1.0.

EXAMPLE 8

VOPO$_4$.2H$_2$O was treated with an excess of 1 M aqueous NH$_4$I. The solid immediately turned dark green and the liquid developed a dark brown color. A solid product was isolated by filtration, washed with H$_2$O, and allowed to dry in the air. An X-ray diffraction pattern of the solid product showed the first three lines of an 001 series indicating a layer spacing of 6.8 Å. The infrared spectrum exhibited bands at 3130 and 1425 cm$^{-1}$ due to NH$_4^+$ ions in addition to bands at 3530 and 1625 due to water molecules. Thermogravimetric analysis shows a weight loss in the region 50°–500° C. of 21.4% and elemental analysis defined the N/V ratio as 0.48. Therefore, the compound is formulated as (NH$_4$)$_{1/2}$VOPO$_4$.2H$_2$O.

The reaction could also be performed using an ethanol solution of NH$_4$I with similar results.

EXAMPLE 9

VOPO$_4$.2H$_2$O was stirred with 0.5 equivalent NMe$_4$I in ethanol. The solid turned dark green and the supernatant developed a red-brown color. After three days at room temperature, the solid was isolated by filtration and washed with ethanol. Infrared analyses showed characteristic bands for Me$_4$N+ at 3015, 1487, 1408 and 947 cm$^{-1}$ in addition to broad H$_2$O bands to 3300 and 1640 cm$^{-1}$. No ethanol was detected. TGA analyses suggested a formula of (NMe$_4$)$_{0.4}$VOPO$_4$.2.4H$_2$O. The product was soluble in water.

EXAMPLE 10

Many other reducing agents can also reduce the VOPO$_4$ lattice, with intercalation of the available cations. In qualitative tests, treatment of VOPO$_4$.2H$_2$O with aqueous solutions of N$_2$H$_4$.2HCl, NH$_2$OH.HCl, SnCl$_2$, N$_2$SO$_3$, NaNO$_2$, Fe(NH$_4$)$_2$(SO$_4$)$_2$, and KNO$_2$ resulted in redox intercalations as demonstrated by a color change of the solid from yellow to green.

We claim:

1. A composition of matter which comprises a cation intercalated in a layered mixed oxide having layers of corner linked octahedra and tetrahedra, said composition having the formula A$_q$MOXO$_4$.nH$_2$O where A is a metallic monovalent, divalent or polyvalent cation selected from Groups IA–VIA, IB–VIIB and VIII of the Periodic Table or A is a non-metallic monovalent, divalent or polyvalent cation selected from Groups IVA–VIIA of the Periodic Table; MOXO$_4$ is a layered mixed oxide selected from the group consisting of VOPO$_4$, VOSO$_4$, VOAsO$_4$, VOMoO$_4$, NbOPO$_4$, NbOAsO$_4$, TaOPO$_4$ and MoOPO$_4$; n is a number from 0 to 4 and q is a number from about 0.001 to about 1.0.

2. The composition of claim 1 wherein MOXO$_4$ is VOPO$_4$, VOSO$_4$, VOAsO$_4$ or VOMoO$_4$.

3. A composition of matter which comprises a cation intercalated in a layered mixed oxide having layers of corner linked octahedra and tetrahedra, said composition having the formula A$_q$MOXO$_4$.nH$_2$O where A is a metallic monovalent, divalent or polyvalent cation selected from Groups IA–VIA, IB–VIIB and VIII of the Periodic Table or A is a non-metallic monovalent, divalent or polyvalent cation selected from groups IVA–VIIA of the Periodic Table; MOXO$_4$ is a layered mixed oxide selected from the group consisting of VOPO$_4$, VOSO$_4$, VOAsO$_4$ and VOMoO$_4$; n is a number from 0 to 4 and q is a number from about 0.001 to about 1.0.

4. The composition of claim 1 or 3 wherein the non-metallic cation is hydrogen or hydronium.

5. The composition of claim 1 or 3 wherein the metallic cation is an organometallic cation or a positively charged coordination complex.

6. The composition of claim 1 or 3 wherein the non-metallic cations are substituted and unsubstituted ammonium, phosphonium, arsonium or sulfonium.

7. The composition of claim 1 or 3 wherein n is from 1 to 3.

8. The composition of claim 1 or 3 wherein q is from about 0.1 to about 0.5.

9. A process for preparing the composition of claim 1 which comprises contacting layered mixed oxides in an aqueous or non-aqueous medium with a reducing agent in the presence of A cations.

10. A composition of matter which comprises a cation intercalated in a layered mixed oxide having layers of corner linked octahedra and tetrahedra, said composition having the formula A$_q$MOXO$_4$.yZ where A is a metallic monovalent, divalent or polyvalent cation selected from Groups IA–VIA, IB–VIIB and VIII of the Periodic Table or A is a non-metallic monovalent, divalent or polyvalent cation selected from Groups IVA–VIIA of the Periodic Table; MOXO$_4$ is a layered mixed oxide selected from the group consisting of VOPO$_4$, VOSO$_4$, VOAsO$_4$, VOMoO$_4$, NbOPO$_4$, NbOAsO$_4$, TaOPO$_4$ and MoOPO$_4$; y is a number from 1 to 4, q is a number from about 0.001 to about 1.0, and Z is a polar solvent.

11. The composition of claim 10 wherein Z is an alcohol, amine, amide or sulfoxide.

* * * * *